Patented Nov. 28, 1950

2,531,869

UNITED STATES PATENT OFFICE 2,531,869

METHOD OF RECOVERING AND PURIFYING STREPTOMYCIN

Harvey E. Alburn and Eric G. Snyder, Philadelphia, Pa., assignors to Wyeth Incorporated, Philadelphia, Pa., a corporation of Delaware No Drawing. Application January 26, 1946, Serial No. 643,747

4 Claims. (Cl. 260—210)

This invention relates to a method of recovering and purifying streptomycin employing phosphoric acid.

Streptomycin is a complex organic nitrogen base possessing valuable antibiotic properties. It is a product of the life processes of the microorganism Streptomyces griseus, and is found dissolved in culture broths on or in which the organism is grown. The free base and many of its salts are soluble in water and the lower alcohols, and may be precipitated from solution by the addition of non-solvent liquids miscible with the solvent.

Streptomycin has a definite "bacterial spectrum" (Waksman, "Microbial Antagonisms and Antibiotic Substances," New York, 1945); it is particularly distinguished from streptothricin by the facts that its antibiotic activity is inhibited by the presence of crysteine and that it may, after such inhibition, be restored by iodine. (Denkelwater et al., Science, 102, 12, July 6, 1945.)

Streptomycin may be recovered by treating clarified broth with an activated carbon adsorbent such as an appropriate grade of Nuchar (Virginia Pulp and Paper Co.), Norit (American Norit Co.), Darco (Darco Corp.), or the like, and eluting the carbon with dilute methanolic hydrogen chloride after washing the carbon successively with water, acetone and methanol. The elution may advantageously be carried out in two steps. The eluates, separately or combined, may then be adjusted to a pH of 6–6.5, settled, clarified and concentrated at a low temperature by vacuum distillation.

Crude streptomycin hydrochloride may be precipitated from the concentrated residue by the addition of 2-3 volumes of ether or 10-15 volumes of acetone. Usually the precipitate is redissolved in methanol and reprecipitated.

The separated and dried precipitate thus obtained is a crude streptomycin hydrochloride preparation generally having a potency of approximately 35 to 70 units per milligram (u./mg.) but occasionally running as high as 100 u./mg. or more. The potency appears to depend to a considerable extent on the potency of the broth and varies in the same sense. Typical broths have potencies of approximately 40 to 100 u./ml. The potency also varies, roughly, inversely as the yield, higher potencies being obtainable under modified conditions with a sacrifice of yield.

The potency of streptomycin preparations, both solid and in solution, is determined by an agar-cup method similar to that used in assaying penicillin, the test microorganism used for streptomycin being B. subtilis. Comparison is made with a standard preparation referred ultimately to a crystalline streptomycin base as unity, i. e. 1000 u./mg., the "unit" being one microgram of crystalline base.

Streptomycin is at present customarily prepared and used in the form of its hydrochloride salt; less commonly the sulfate is encountered. Present tentative minimum specifications call for a streptomycin product having a potency of at least 200 u./mg., substantially free of pyrogenic and histamine effect, and non-toxic.

Various methods have been proposed for purifying crude streptomycin and preparations of high potency and purity have been reported. For example, Fried and Wintersteiner (Science, 101, 613–615, June 15, 1945) used the so-called reineckate for purification, a crystalline salt resulting from reaction of streptomycin with Reinecke salt $NH_4[Cr(SCN)_4(NH_3)_2]$. Kuehl et al. (Science, 102, 34–35, July 13, 1945) report the preparation of a crystalline helianthate by treating an aqueous methanol solution of highly purified streptomycin hydrochloride with methyl orange. The helianthate may be converted to a hydrochloride having a potency of 800 u./mg. Peck et al. (J. Am. Chem. Soc., 67, 1866–1867, October, 1945) report the preparation of a crystalline streptomycin-$CaCl_2$ double salt by treating the hydrochloride or helianthate with methanolic $CaCl_2$. Carter et al. (J. Biol. Chem., 160, 337–342, September, 1945) report on a chromatographic method of obtaining streptomycin fractions of high potency—520–900 u./mg.

These reported methods prove that it is possible to produce streptomycin preparations of high potency and purity. They all, however, appear to require a starting material of relatively high potency or to involve the use of unusual reagents or complicated equipment or to require extensive and careful control in operation or to result in a low yield of product. They all appear to be methods of a laboratory type; none appears to combine the simplicity of operation, employment of cheap readily available materials and ability to give high yields of product desirable in a large-scale commercial operation.

We have discovered that a streptomycin phosphate has all the characteristic antibiotic properties of the previously known and used free base, hydrochloride and sulfate, and in addition has unexpected properties that adapt it peculiarly to simple and economical purification.

It is one object of our invention to provide a simple and economical method of increasing the potency of streptomycin.

It is another object of our invention to provide a method of streptomycin purification which requires only relatively cheap and readily available materials.

It is a further object of our invention to provide a method of producing a high yield of streptomycin of greatly increased potency from crude streptomycin of relatively low potency.

It is a still further object of our invention to provide a potent streptomycin phosphate preparation which is non-toxic, non-pyrogenic, and antibiotic.

Other objects and advantages of our invention will be apparent from the following description.

According to our invention, we obtain streptomycin phosphate from crude streptomycin by adjusting the pH of a solution of the crude antibiotic, such as the eluate of the adsorbate from the broth obtained in conventional streptomycin production as described above, to a value of at least about 8 and preferably not above 9, precipitating a basic streptomycin compound, dissolving the basic compound in dilute phosphoric acid, and precipitating a streptomycin phosphate from the solution. We prefer to use methanol as the solvent in these operations and acetone or dioxane as the precipitant. Other solvents may be used, however, such as ethanol, and other precipitants such as ethyl ether. Alternatively, the precipitation of the basic compound may be omitted if a solution of the base is available substantially free of acid anions which would contaminate the final phosphate precipitate.

We have found that if we prepare a streptomycin phosphate as above described, using as solvent substantially water-free methanol, a greater increase in potency is effected by the final precipitation of the phosphate with a precipitant such as acetone than results from a similar precipitation of the free base or its other water-soluble salts known to us, such as the hydrochloride. In other words, the phosphate, prepared as described, lends itself particularly well to purification by selective precipitation. The phosphate also has less tendency than the hydrochloride to form gummy precipitates. The phosphate may be further purified by the two-step process of our co-pending application Serial No. 640,140, filed January 9, 1946, now Patent No. 2,505,318, and entitled "Recovery and Purification of Antibiotics."

If, for example, a dilute, approximately neutral methanol solution of the crude streptomycin phosphate described is agitated at room temperature with a small percentage of a suitable activated carbon such as Nuchar C-1000, filtered and mixed with 5-15 volumes of acetone, a high yield of a streptomycin phosphate of substantially increased potency is obtained.

The acidity of the methanol solution should be adjusted to pH 3-7 for best results.

While ethanol may serve as the solvent, we have found methanol to be the preferred solvent for our process. The methanol used should have a low water content, preferably not over about 3%. With higher water content, e. g. 10 percent, adsorption of solids by activated carbon at or near the neutral point is quantitatively greater but is less selective; in precipitating the streptomycin phosphate described the precipitation appears to be less complete and less selective in the presence of such excess water and the precipitate tends to be gummy. An excessive water content thus contributes both to lower yield and lower potency of the final product.

Ethyl ether may be used as the precipitant in our second step, and has the advantage that only 2-3 volumes are required. We prefer to use acetone, however, in spite of the fact that 5-15 volumes must be used. Among the reasons for this preference are: less sensitivity to the presence of water in the methanol, less tendency to form gummy precipitates, greater selectivity in precipitation especially as respects inorganic salts, higher boiling point, and somewhat less fire hazard. Dioxane can also be used satisfactorily in place of acetone in substantially the same amounts.

If a streptomycin hydrochloride solution serves as the starting material in our process, e. g. a methanol-HCl eluate of a streptomycin adsorbate, we may proceed as follows. The pH of the solution is adjusted to at least about 8 and preferably not above 9, e. g. by adding methanolic KOH or by treating with an anion-exchange material (as described below) and then making a final adjustment with methanolic KOH; a basic streptomycin compound is next precipitated from the faintly alkaline solution as by adding 5-15 volumes of acetone; the precipitate is dissolved in dilute methanolic phosphoric acid; and a streptomycin phosphate is selectively precipitated as by adding 5-15 volumes of acetone.

If a carbon treatment is used, it is preferably applied to the acid phosphate solution after adjusting its pH to about 3-7.

Precipitation of the basic compound may be dispensed with. A suitable solution for precipitation of the streptomycin phosphate described is obtained if neutralization of a methanol-HCl eluate is accomplished chiefly by means of a solid anion-exchange material such, for example, as Amberlite IR-4 (sold by the Resinous Products and Chemical Co. of Philadelphia) or equivalent. These materials are sold and ordinarily used with a substantial water content; they are inactive when completely dry. They would not be satisfactory for our purposes in the wet form, since they would introduce an undesired amount of water into the methanol solution. It has been found, however, that if they are sucked dry on a vacuum filter, slurried with methanol and drained, they may be brought to a state of reduced water content in which they will still effect anion exchange without introducing any deleterious amount of water into the solution. In the present invention these exchange materials are used in the active form, i. e. in a condition to effect substantial neutralization of the treated solution. When inactivated by use they are reactivated, e. g. by treating with a sodium carbonate solution.

After treatment with the anion-exchange material, if the basic compound is to be precipitated the solution is finally adjusted to the desired pH (e. g. 8–8.5) by adding a small amount of alkali such as methanolic KOH and then mixed with precipitant such as ether, acetone or dioxane. If precipitation of the basic compound is to be omitted, dilute alcoholic phosphoric acid is added directly to the deanionized solution and the phosphate then precipitated. The pH before precipitation is advantageously in the range of approximately 3.5–4.5, preferably approximately 3.8–4.0.

The following examples illustrate several embodiments of our invention, but they are intended to be illustrative only, and not to limit our invention, the scope of which is defined in the appended claims.

Example 1

A solution was prepared of 172,000 units of streptomycin hydrochloride, having a potency of 145 u./mg., in 150 ml. of substantially water-free methanol, and the pH was adjusted to 8.1 by adding methanolic KOH. A basic streptomycin compound was precipitated by adding 5 volumes (750 ml.) of acetone. The basic compound was redissolved in 150 ml. 0.1 N methanolic $H_3PO_4$ and a streptomycin phosphate was precipitated from the acid solution by adding 5 volumes (750 ml.) of acetone. The precipitate recovered had a potency of 470 u./mg. and its total potency represented a complete recovery of that of the original streptomycin hydrochloride, i. e. 100 percent yield.

While we recognize that the results of a restricted number of small-scale experiments depending on a microbiological assay such as that described above cannot be relied on for precise quantitative evaluation of this process, we have found that a useful approximate comparison may be made by means of two factors, $P$=the ratio of final to original potency per milligram, and $E=P\times$ (fraction of total potency recovered). In the present example, $P=3.2$ and $E=3.2$.

Example 2

In this example precipitation of the basic compound was omitted and a carbon-treatment step added. A solution was prepared of 154,000 units of streptomycin hydrochloride, having a potency of 93 u./mg., in 180 ml. of substantially water-free methanol; by treatment with an anion-exchange material (Amberlite IR–4) and the subsequent addition of a little methanolic NaOH, the pH of the solution was brought to 8.0. Thereafter, without precipitating a streptomycin basic compound, enough 5 percent methanolic $H_3PO_4$ was added to bring the pH to 4.0. The faintly acid solution was then stirred for 20 minutes at room temperature with 2 percent (2 grams per 100 ml.) of activated carbon (Nuchar C–750) and filtered. A streptomycin phosphate was then precipitated by adding 5 volumes of acetone. The precipitate recovered had a potency of 397 u./mg. and the overall potency yield was 82 percent. Using the notation of Example 1, $P=4.3$ and $E=3.5$. If E is considered as representing efficiency, the efficiency of this example is slightly better than that of Example 1, although the starting material was much less potent. The potency of the end product was not as great as in Example 1, but the increase in potency as represented by the ratio P was considerably greater.

Example 3

In this example both the steps of low-pH precipitation and carbon treatment were used. This resulted in a relatively great increase in potency (P) but the yield was reduced and the overall efficiency (E) was not as high as in the previous examples.

Two million units of streptomycin hydrochloride, having a potency of 95 u./mg., were dissolved in 1 l. methanol and the pH was adjusted to 8.25 with methanolic NaOH. A basic compound was then precipitated with 5 l. acetone and redissolved in 1 l. methanol; the pH of this solution was brought to 3.8 with methanolic $H_3PO_4$. This phosphate solution contained 93 percent of the original antibiotic activity at a concentration of approximately 1850 u./ml. A portion of this solution was diluted to a potency concentration of 925 u./ml., treated with 2 percent (2 g. per 100 ml.) of activated carbon (Nuchar C–1000) at room temperature and filtered. A streptomycin phosphate was precipitated from the filtrate with acetone as above described. The recovered precipitate had a potency of 426 u./mg. and represented a 60 percent overall recovery calculated back to the original streptomycin hydrochloride. $P=4.5$ and $E=2.7$.

Samples of the streptomycin phosphate preparations described were tested biologically as described below to prove their typical streptomycin behavior and their suitability for use in therapeutic treatment of higher living organisms.

Example 4

(a) *Behavior with cysteine.*—Cysteine hydrochloride in an amount equivalent to 2 mg./ml. was added to an aqueous solution of a streptomycin phosphate having a potency concentration of 40 u./ml. The solution was inactivated, the mixture having a potency of 0.9 u./ml. Treatment with sufficient iodine to oxidize the cysteine restored the potency to a level of 39 u./ml. This behavior is characteristic of streptomycin.

(b) *Histamine effect.*—Impure streptomycin preparations may contain toxic materials which, like histamine, depress the blood pressure on introduction into the blood stream. Streptomycin phosphate samples produced according to our invention proved to be practically free of this effect when tested by the official Food and Drug Administration method.

(c) *Pyrogens.*—A sample of a streptomycin phosphate prepared according to our invention and assaying 415 u./mg. potency proved to be pyrogen-free when tested biologically.

(d) *Toxicity.*—Samples of our streptomycin phosphate having a potency greater than 200 u./mg. were tested by the official Food and Drug Administration method for toxicity and passed this test. The test involves injecting 1000 micrograms of streptomycin intravenously into each of five mice; if all survive, the product used passes the test.

A streptomycin phosphate sample having a lower potency than 200 u./mg. (specifically 175 u./mg.) did not pass.

Example 5

As noted above, streptomycin has a characteristic "bacterial spectrum." Samples of our streptomycin phosphate were tested with 6 microorganisms in comparison with a standard streptomycin preparation and proved to have characteristic streptomycin antibiotic properties. The following table shows the results obtained with two such streptomycin phosphate samples and with a standard preparation. The first column identifies the streptomycin used; the six following columns give the results obtained with the microorganism identified at the head of each column. Results are in terms of the range of the minimum number of units in which inhibition of the growth of the respective organism occurred.

|  | Ps. aeruginosa Smith | B. proteus Morganii | B. mycoides | E. typhosa Rawlings | E. coli #1045 | B. aureus |
|---|---|---|---|---|---|---|
|  | Units | Units | Units | Units | Units | Units |
| Streptomycin Phosphate I | 10–50 | 1–3 | 1–3 | 1–6 | >100 | 1–6 |
| Streptomycin Phosphate II | 10–50 | 1–3 | <1 | 1–3 | >100 | 1–3 |
| Standard Streptomycin | 50–100 | 1–3 | 1–3 | <1 | >100 | 1–3 |

Streptomycin free base is a tri-acid base having the probable composition $C_{12}H_{37}N_7O_{12}$—Peck, Brink, Kuehl, Flynn, Walti and Folkers, J. Am. Chem. Soc., 67 (1945), 1866–7. Accordingly, numerous salt-forming possibilities with a tri-basic acid such as phosphoric exist.

From the above it will be apparent that we have discovered a new form of streptomycin, a streptomycin phosphate, having unexpectedly desirable properties that adapt it to ready purification and to therapeutic use in higher animal organisms. More particularly our invention comprises particularly effective and economical methods for purifying streptomycin by way of this phosphate and for adapting these purification methods to the recovery of streptomycin from suitable culture broths; these methods are especially applicable to treating a crude streptomycin salt of low potency, such as streptomycin hydrochloride having a potency less than 150 u./mg., and converting it in good yield to a product of at least 3 times its original potency. The crude salt treated may be originally in solution, as in a production eluate, or may be a solid preparation which is brought into solution before being treated by our methods.

We claim:

1. The method of enhancing the potency of a crude streptomycin salt contained in dilute solution in a substantially water-free lower alcohol which comprises adding phosphate ion to the solution without substantial addition of water thereto, and selectively precipitating a streptomycin phosphate of enhanced potency from the solution at a pH not above about 4 by adding to the solution a liquid non-solvent for the streptomycin phosphate which is miscible with the lower alcohol.

2. The method defined in claim 1 in which the dilute alcoholic solution of the crude streptomycin salt is a methanolic-hydrochloric-acid eluate of a culture broth adsorbate.

3. The method of enhancing the potency of a crude streptomycin salt contained in dilute solution in a substantially water-free lower alcohol which comprises removing anions from the solution without substantial addition of water thereto by contacting the solution with a partially dewatered solid comminuted anion-exchange material, adding an excess of phosphoric acid to the solution, and selectively precipitating a streptomycin phosphate of enhanced potency from the acid solution by adding thereto a liquid non-solvent for the streptomycin phosphate which is miscible with the alcohol used.

4. The method of enhancing the potency of a crude streptomycin salt dissolved in a substantially water-free lower alcohol which comprises adjusting the reaction of the solution to the approximate range pH 8–pH 9 without adding water thereto, precipitating a basic streptomycin compound by adding to the solution a liquid non-solvent for the basic streptomycin compound which is miscible with the alcohol, separating the precipitate and redissolving it in alcoholic phosphoric acid, and precipitating a streptomycin phosphate of enhanced potency by adding to the solution a liquid non-solvent for the streptomycin phosphate which is miscible with the alcohol.

HARVEY E. ALBURN.
ERIC G. SNYDER.

REFERENCES CITED

The following references are of record in the file of this patent:

UNITED STATES PATENTS

| Number | Name | Date |
|---|---|---|
| 716,776 | Spiegel | Dec. 23, 1902 |
| 1,548,566 | Volck | Aug. 4, 1925 |
| 2,408,975 | Engel | Oct. 8, 1946 |
| 2,443,485 | Waksman | June 15, 1948 |
| 2,462,175 | Folkers | Feb. 22, 1949 |

OTHER REFERENCES

Carter et al.: J. Biol. Chem. v. 160 (1945), pp. 337–342, 6 pages.

Waksman et al.: J. Am. Pharm. Assoc., v. 34 (1945), pp. 276–277, 2 pages.

Vander Brook et al.: J. Biol. Chem., v. 165 (1946), pp. 463–468, 6 pages.

Raikow et al.: Chemiker-Zeitung, vol. 25 (1901), pages 222, 243, 244, 261, 280 and 281.

Cheronis: "Semimicro and Macro Organic Chemistry," pages 26 and 27 (Crowell; New York; 1942).

Waksman et al.: Proc. Soc. Exp't'l Biol. and Med., vol. 49 (1942), pages 207–210.

Schatz: Proc. Soc. Exp't'l Biol. & Med., vol. 55 (1944), pages 66–69.

Kuehl et al.: Science, vol. 102, pages 34 and 35 (July 1945).

Peck et al.: J. A. C. S., vol. 67 (Oct. 1945); pages 1866 and 1867.